(12) United States Patent
Oomura et al.

(10) Patent No.: US 7,997,331 B2
(45) Date of Patent: Aug. 16, 2011

(54) AIR-CONDITIONING SYSTEM

(75) Inventors: Mitsuyo Oomura, Hekinan (JP);
Takeshi Wakisaka, Ichinomiya (JP);
Katsutoshi Hirose, Nagoya (JP)

(73) Assignee: Denso Corporation, Kariya (JP)

( * ) Notice: Subject to any disclaimer, the term of this patent is extended or adjusted under 35 U.S.C. 154(b) by 1103 days.

(21) Appl. No.: 11/715,742

(22) Filed: Mar. 8, 2007

(65) Prior Publication Data
US 2007/0209789 A1 Sep. 13, 2007

(30) Foreign Application Priority Data

Mar. 10, 2006 (JP) ................................. 2006-065956

(51) Int. Cl.
*B60H 1/00* (2006.01)
*F25H 29/00* (2006.01)
*F28F 17/00* (2006.01)

(52) U.S. Cl. ........................... 165/202; 165/231; 62/244
(58) Field of Classification Search .................. 165/202, 165/231; 62/150, 151, 152, 153, 154, 155, 62/156, 157, 159, 197, 231, 244, 324.1
See application file for complete search history.

(56) References Cited

U.S. PATENT DOCUMENTS

| | | | |
|---|---|---|---|
| 4,471,632 A | 9/1984 | Nishi et al. | |
| 4,474,026 A * | 10/1984 | Mochizuki et al. | 62/157 |
| 4,578,959 A * | 4/1986 | Alsenz | 62/151 |
| 5,299,431 A * | 4/1994 | Iritani et al. | 62/159 |
| 5,467,606 A | 11/1995 | Sasaki et al. | |
| 6,230,506 B1 | 5/2001 | Nishida et al. | |
| 6,715,304 B1 * | 4/2004 | Wycoff | 62/155 |
| 6,775,998 B2 * | 8/2004 | Yuasa et al. | 62/197 |
| 2004/0050083 A1 * | 3/2004 | Yuasa et al. | 62/222 |
| 2004/0177628 A1 | 9/2004 | Kurata et al. | |
| 2006/0117768 A1 * | 6/2006 | Lee et al. | 62/154 |
| 2007/0209380 A1 * | 9/2007 | Mueller et al. | 62/324.1 |
| 2010/0024452 A1 * | 2/2010 | Lifson et al. | 62/154 |

FOREIGN PATENT DOCUMENTS

| | | |
|---|---|---|
| JP | 58-64437 | 4/1983 |
| JP | 02-48213 | 2/1990 |
| JP | 05-296586 | 11/1993 |
| JP | 06-137633 | 5/1994 |
| JP | 09-109657 | 4/1997 |
| JP | 11-78508 | 3/1999 |
| JP | 2000-146329 | 5/2000 |
| JP | 2003-172553 | 6/2003 |
| JP | 2004-61061 | 2/2004 |
| JP | 2004-255913 | 9/2004 |

* cited by examiner

*Primary Examiner* — Ljiljana (Lil) V Ciric
(74) *Attorney, Agent, or Firm* — Harness, Dickey & Pierce, PLC

(57) ABSTRACT

An air-conditioning system allows adjustment of the vented air temperature of a rear seat evaporator. An electronic control system judges whether the surface of the rear seat evaporator is frosting up when 1) a target blowing rate of the rear seat blower is lower than a predetermined value, 2) a detected temperature of evaporator vented air is lower than a specified temperature TEa, and 3) a detected temperature of the outside air is lower than a specified temperature TAMa. A target temperature TEO is raised at this time, so that an electric motor of an electric compressor is stopped and refrigerant no longer flows into the rear seat evaporator. The surface temperature of the rear seat evaporator rises so that the rear seat evaporator can be defrosted.

9 Claims, 9 Drawing Sheets

AIR-CONDITIONING SYSTEM

BACKGROUND OF THE INVENTION

1. Field of the Invention

The present invention relates to an air-conditioning system having at least two evaporators.

2. Description of the Related Art

In the past, as a vehicular air-conditioning system, there has been one provided with a compressor compressing a refrigerant, a condenser cooling a refrigerant discharged from the compressor, a front seat expansion valve reducing the pressure of the refrigerant discharged from this condenser, a front seat evaporator evaporating a refrigerant from this front seat expansion valve to cool the air, a rear seat expansion valve arranged in parallel with a front seat expansion valve in the flow of refrigerant from the compressor, and a rear seat evaporator evaporating refrigerant from the rear seat expansion valve to cool the air (for example, see Japanese Patent Publication (A) No. 5-296586).

This system is provided with a temperature sensor for detecting the temperature of the vented air from the front seat evaporator and an electronic control system for controlling the compressor based on a detection value of this temperature sensor so as to make the temperature of the vented air of the front seat evaporator close to a target temperature TEO.

In the above vehicular air-conditioning system, when setting the target temperature TEO of the vented air temperature of the front seat evaporator at an extremely low temperature, the vented air temperature of the temperature sensor is made to approach the target temperature TEO by increasing the discharge capacity of the refrigerant of the compressor. For this reason, the flow rates of the refrigerant flowing into the front seat evaporator and rear seat evaporator are also increased. At this time, if the blowing rate of the rear seat blower is small, the amount of heat absorbed by the refrigerant at the rear seat evaporator becomes smaller, so the surface of the rear seat evaporator is frosting up and the vented air temperature of the rear seat evaporator can no longer be adjusted.

SUMMARY OF THE INVENTION

An object of the present invention is to provide an air-conditioning system provided with at least two evaporators preventing the temperature of the vented air of the evaporators from not being able to be adjusted.

The present invention was completed taking note of the fact that when the vented air temperature of the front seat evaporator (first evaporator) is low, the discharge capacity of the refrigerant of the compressor becomes greater, so the flow rate of the refrigerant in the rear seat evaporator becomes greater.

Specifically, the present invention has as its first characteristic the provision of a frosting detector (S22, S23, S24) for judging that the surface of the second evaporator is frosting up when the blowing rate of the second blower is less than the predetermined amount (B) and a detection value of a temperature sensor is less than a first temperature (TEa) and a refrigerant control (S13, S35) for reducing the amount of discharge of the refrigerant from the compressor to defrost the second evaporator when it is judged that the surface of the second evaporator is frosting up.

Therefore, even if the surface of the second evaporator is frosting up, the second evaporator can be defrosted, so the vented air temperature of the second evaporator can be prevented from becoming unable to be adjusted.

Further, the present invention has as its second characteristic that when it is judged that the surface of the second evaporator is not frosting up, the refrigerant control uses a value found by the first temperature calculator as the target temperature (TEO) to control the compressor, while when it is judged that the surface of the second evaporator is frosting up, the refrigerant control uses a value found by the second temperature calculator as the target temperature (TEO) to control the compressor and that the refrigerant control uses the value found by the second temperature calculator as the target temperature (TEO) to control the compressor so as to reduce the amount of discharge of the refrigerant from the compressor.

Due to this, if raising the target temperature (TEO), then judging that the surface of the second evaporator is not frosting up, it is possible to return the target temperature (TEO) to the value found by the first temperature calculator without special processing.

The present invention has as its third characteristic the provision of a frosting detector (S22, S23, S24) for judging that the surface of the second evaporator is frosting up when a blowing rate of the second blower is less than a predetermined flow rate (B, B+d) and the detection value of a temperature sensor is less than the first temperature (TEa, TEb) and a blowing control for increasing the blowing rate from the second blower to defrost the second evaporator when it is judged that the surface of the second evaporator is frosting.

Due to this, even when the surface of the second evaporator is frosting up, the second evaporator can be defrosted, so the temperature of the vented air of the second evaporator can be prevented from becoming unable to be adjusted.

In this case, the second evaporator can be defrosted without relation to the operation of the compressor, so the second evaporator can be defrosted while refrigerant flows from the compressor to the first evaporator.

The present invention has as its fourth characteristic that when it is judged that the surface of the second evaporator is not frosting up by the frosting detector, the blowing control controls the second blower so as to make a blowing rate of the second blower approach the target blowing rate found by the first blowing rate calculator, while when it is judged that the surface of the second evaporator is frosting up, the blowing control controls the second blower so as to make a blowing rate of the second blower approach the blowing rate found by the second blowing rate calculator and that the blowing control controls the second blower so as to increase the blowing rate from the second blower so as to make a blowing rate of the second blower approach the blowing rate found by the second blowing rate calculator.

Due to this, if raising the target blowing rate of the second blower, then judging that the surface of the second evaporator is not frosting up, it is possible to return the target blowing rate to the value found by the first blowing rate calculator without special processing.

The present invention has as its fifth characteristic the provision of a blowing control reducing the blowing rate from the first blower to defrost the second evaporator when it is judged that when the surface of the second evaporator is frosting up.

Here, if reducing the blowing rate of the first blower, in the first evaporator, the refrigerant can sufficiently absorb heat from the blown air. For this reason, the temperature of the vented air detected by the temperature sensor falls and approaches the target temperature, so the discharge capacity of the refrigerant of the compressor falls. Therefore, the amount of the refrigerant flowing into the second evaporator falls, so the second evaporator can be defrosted.

The present invention has as its sixth characteristic that when it is judged that the surface of the second evaporator is not frosting up by the frosting detector, the blowing control controls the first blower so as to make a blowing rate of the first blower approach the target blowing rate found by the first blowing rate calculator, while when it is judged that the surface of the second evaporator is frosting up, the blowing control controls the first blower so as to make a blowing rate of the first blower approach the blowing rate found by the second blowing rate calculator and that the blowing control controls the first blower so as to decrease the blowing rate from the first blower so as to make a blowing rate of the first blower approach the blowing rate found by the second blowing rate calculator.

Therefore, if lowering the target blowing rate of the first blower, then judging that the surface of the second evaporator is not frosting up, it is possible to return the target blowing rate to the value found by the first blowing rate calculator without special processing. Further, the greater the blowing rate of the first blower, the greater the amount of air not cooled by the refrigerant in the air blown from the first blower, so the vented air temperature of the first evaporator rises. At this time, the difference between the vented air temperature of the first evaporator and the target temperature increases, so the discharge capacity of the refrigerant of the compressor increases. Therefore, the amount of the refrigerant flowing into the second evaporator increases, so the second evaporator easily is frosting up.

As opposed to this, the present invention has as its seventh characteristic that the frosting detector raises the predetermined flow rate (B) the greater the blowing rate of the first blower when judging that the surface of the second evaporator is frosting up.

Therefore, whether the surface of the second evaporator is frosting up can be accurately judged.

In general, in the summer or otherwise when the temperature of the outside air is high, the surfaces of the evaporators will not frost up. As opposed to this, the present invention has as its eighth characteristic that the frosting detector (S22, S23, S24) judges that the surface of the second evaporator is not frosting up when the detection temperature of the outside air temperature sensor is a second temperature (TAMb) or more and judges that the surface of the second evaporator is frosting up when the detection temperature of the outside air temperature sensor is less than the second temperature, a blowing rate of the second blower is less than a predetermined amount, and a detection value of the temperature sensor is less than a first temperature.

Therefore, mistaken judgment that the surface of the second evaporator is frosting up when the outside air temperature is high can be avoided, so whether the surface of the second evaporator is frosting up can be accurately judged. Note that the reference numerals in the parentheses following the above show the correspondence with the specific embodiments explained later.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
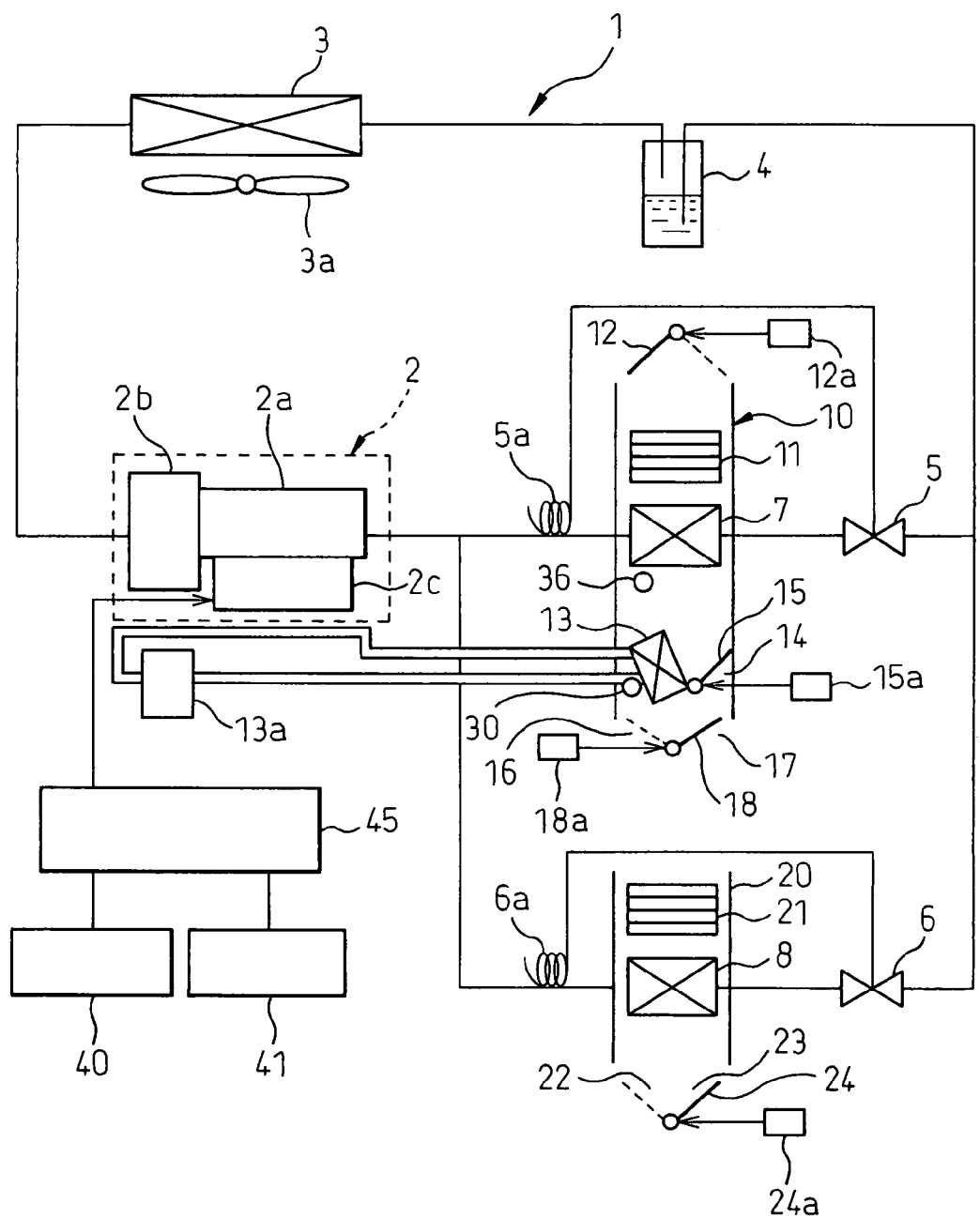
FIG. 1 is a view of the overall configuration of an embodiment of a vehicular air-conditioning system according to the present invention.

FIG. 1 is a view of the overall configuration of an embodiment of a vehicular air-conditioning system according to the present invention. The vehicular air-conditioning system is provided with a refrigeration cycle system 1. The refrigeration cycle system 1 is comprised of an electric compressor 2, condenser 3, receiver 4, front seat expansion valve 5, rear seat expansion valve 6, front seat evaporator 7, and rear seat evaporator 8. The electric compressor 2 is comprised of an electric motor 2a and compression mechanism 2b. The electric motor 2a is controlled in speed by an inverter 2c. The compression mechanism 2b is driven by the electric motor 2a and sucks in, compresses, and discharges the refrigerant. It can continuously change the discharge capacity in the range of 0 to 100% in accordance with the speed of the electric motor 2a.

The condenser 3 cools and compresses the refrigerant from the electric compressor 2 by the air blown from the condenser blower 3a. The receiver 4 separates the refrigerant discharged from the condenser 3 into gas and liquid and stores the excess refrigerant. The front seat expansion valve 5 reduces the pressure of the refrigerant discharged from the receiver 4, is provided with a temperature detection part 5a for detecting the temperature of the refrigerant of the outlet side of the front seat evaporator 7, and adjusts the flow rate based on the detection temperature of this temperature detection part 5a. The front seat evaporator 7 is provided in a front seat air-conditioner casing 10 and cools the air blown from a front seat blower 11 by evaporation of the refrigerant discharged from the front seat expansion valve 5.

At the upstream most side of the front seat air-conditioner casing 10, an inside and outside air switching door 12 for selectively introducing inside air and outside air is provided. The inside and outside air switching door 12 is driven by a servo motor 12a. In the front seat air-conditioner casing 10 at the downstream side of the front seat evaporator 7 is provided a heater unit 13. The heater unit 13 heats the cool air blown out from the front seat evaporator 7 by the warm water from a heat source 13a. As the heat source 13a, a vehicle engine, fuel cell in a fuel cell vehicle, combustion type heater, etc. is used. At the side of the heater unit 13, a bypass passage 14 for carrying cool air from the front seat evaporator 7 is provided bypassing the heater unit 13.

At the upstream side of the heater unit 13 is provided an air mix door 15. The air mix door 15 changes the ratio of the amount of air flowing into the heater unit 13 and the amount of air flowing into the bypass passage 14 to adjust the temperature of the air blown into the vehicle compartment. The air mix door 15 is driven by a servo motor 15a. At the downstream most side of the front seat air-conditioner casing, a foot vent 16 and face vent 17 are provided. At the upstream side of the vents 16, 17, a vent door 18 opening and closing them is provided. The vent door 18 is driven by a servo motor 18a.

Further, the rear seat expansion valve 6 is provided in parallel with the front seat expansion valve 5 in the flow of the refrigerant from the electric compressor 2. The rear seat expansion valve 6 reduces the pressure of the refrigerant discharged from the receiver 4, is provided with a temperature detection part 6a for detecting the temperature of the refrigerant at the outlet side of the rear seat evaporator 8, and adjusts the flow rate based on the detection temperature of this temperature detection part 6a. The rear seat evaporator 8 is provided inside a rear seat air-conditioner casing 20 and cools the air blown from the rear seat blower 21 by evaporation of the refrigerant discharged from the rear seat expansion valve 6. At the downstream most side of the rear seat air-conditioner casing 20 are provided a foot vent 22 and face vent 23. At the upstream side of the vents 22, 23, a vent door 24 for selectively opening and closing the vents 22, 23 is provided. The vent door 24 is driven by a servo motor 24a.

Figure 2:
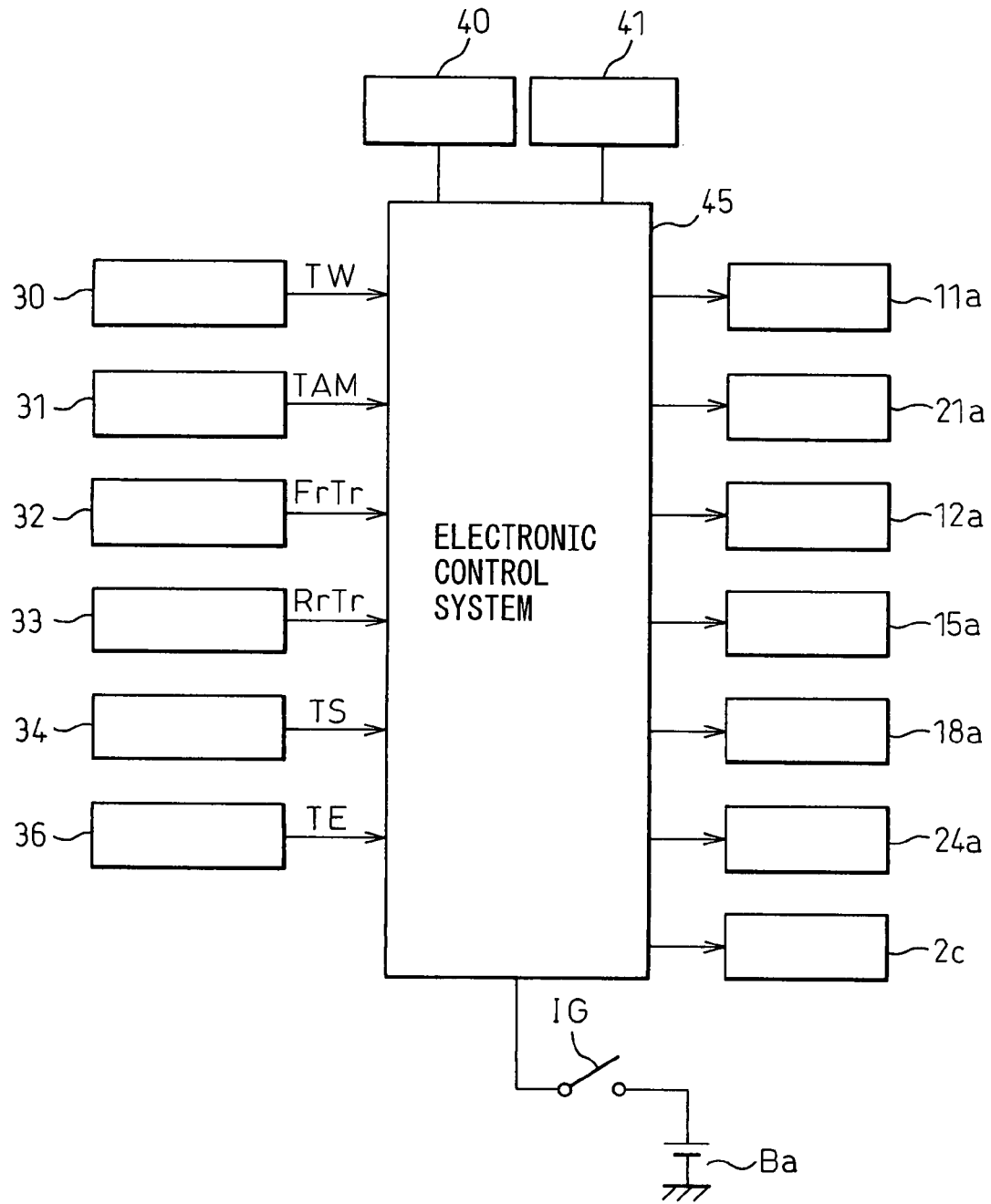
FIG. 2 is a block diagram showing the electrical configuration of the vehicular air-conditioning system of FIG. 1.

Next, the general electric configuration of the vehicular air-conditioning system of the present embodiment will be explained with reference to FIG. 2.

A vehicular air-conditioning system is provided with a water temperature sensor 30, outside air temperature sensor 31, inside air temperature sensors 32, 33, sunlight sensor 34, evaporator vented air temperature sensor 36, operation panels 40, 41, and electronic control system 45. The water temperature sensor 30 detects the temperature of the warm water flowing into the heater unit 13. The outside air temperature sensor 31 detects the air temperature outside the vehicle compartment. The inside air temperature sensor 32 detects the air temperature at the front seat side in the vehicle compartment. The inside air temperature sensor 33 detects the air temperature at the rear seat side in the vehicle compartment. The sunlight sensor 34 detects the amount of sunlight entering the vehicle compartment. The evaporator vented air temperature sensor 36 detects the vented air temperature of the front seat evaporator 7.

The operation panel 40 is provided with an A/C switch and a temperature setter. The A/C switch turns the electric compressor 2 on/off. The temperature setter is a switch for setting a target temperature FrTset of the air temperature at the front seat side. The operation panel 41 is provided with a temperature setter. The temperature setter is a switch for setting a target temperature RrTset of the air temperature at the rear seat side.

The electronic control system 45 is comprised of a microcomputer, memory, etc. and controls the drive motor 11a of the blower 11, the drive motor 21a of the blower 21, the servo motors 12a, 15a, 18a, 24a, and the inverter 2c of the electric compressor 2 based on the detection signals from the sensors 30, 31 . . . 36 and operation signals from the operation panels 40, 41.

Next, the operation of the present embodiment in the above configuration will be explained with reference to FIG. 3. The electronic control system 45 executes a computer program in accordance with the flow chart of FIG. 3. The computer program is started when the ignition switch IG is turned on and the power source Ba is turned on. First, at step S1, the memory flag, timer, etc. are initialized, then at the next step S2, the operation signals from the operation panels 40, 41 are read. At the next step S3, the operation signals of the operation panel 11 are read, then at the next step S4, the detection signals from the sensors 30, 31, 32, 33, 34, 36 are read. Next, at step S5, the target venting temperature FrTAO blown to the front seat side of the vehicle compartment is calculated by equation (1). FrTAO is the venting temperature required for maintaining the air temperature at the front seat side in the vehicle compartment at the set temperature FrTse regardless of the change in the air-conditioning heat load in the vehicle compartment.

$$FrTAO = FrKset \times FrTset - FrKr \times FrTr - FrKam \times TAM - FrKs \times Ts + FrC \quad (1)$$

where FrTr is the detection temperature of the inside air temperature sensor 32 at the front seat side, and Ts is the detection temperature of the water temperature sensor 30. FrKset, FrKr, FrKam, and FrKs are control gains, while FrC is a correction constant.

Next, the target venting temperature RrTAO blown to the rear seat side in the vehicle compartment is calculated by equation (2). RrTAO is the venting temperature required for maintaining the air temperature of the rear seat side in the vehicle compartment at the set temperature RrTset regardless of the change in the air-conditioning heat load in the vehicle compartment.

$$RrTAO = RrKset \times RrTset - RrKr \times RrTr - RrKam \times TAM - RrKs \times Ts + RrC \quad (2)$$

where, RrTr is the detection temperature of the inside air temperature sensor 33 at the rear seat side. RrKset, RrKr, RrKam, and RrKs are control gains, while RrC is a correction constant.

Figure 3:
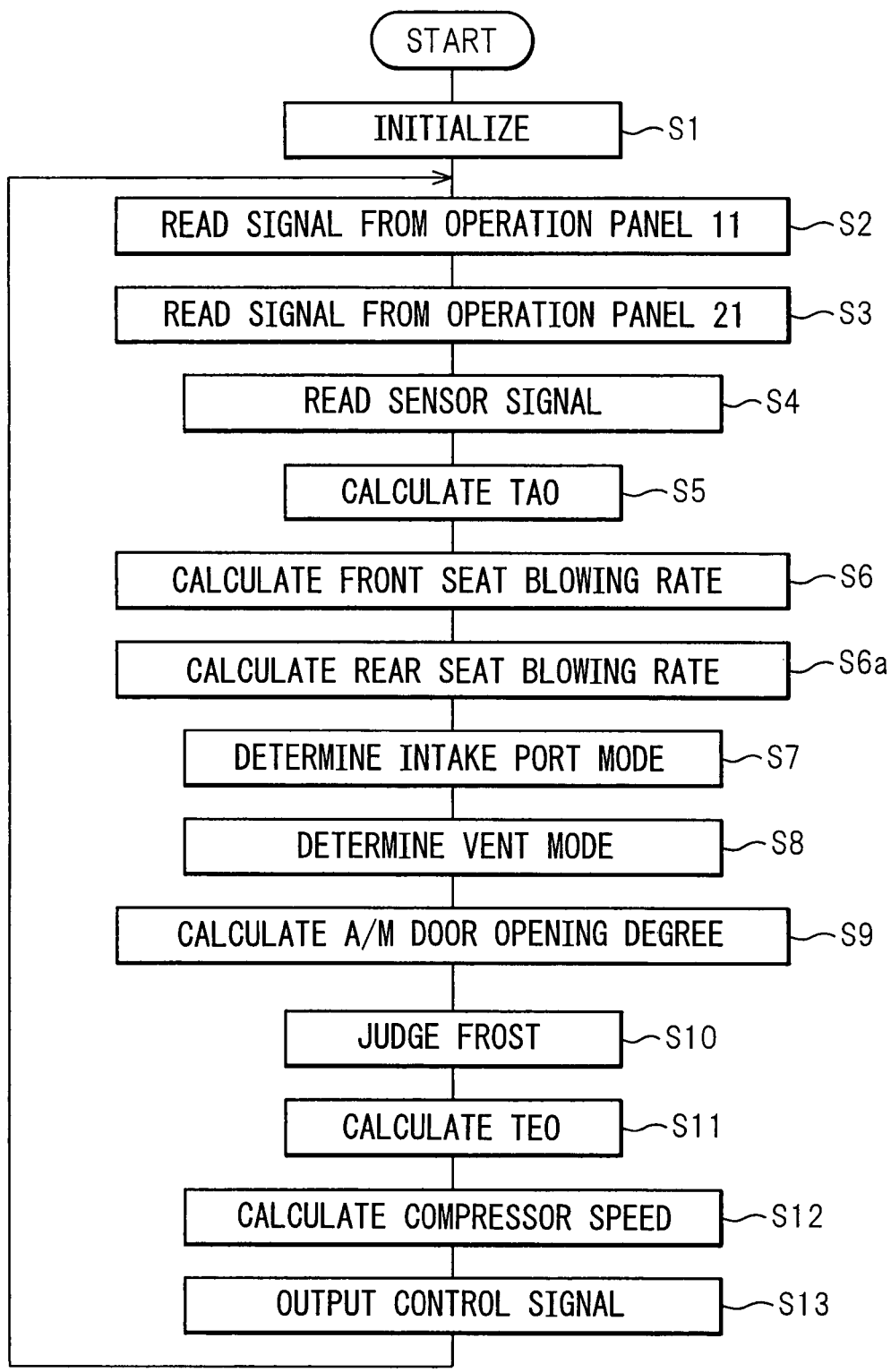
FIG. 3 is a flow chart showing the control processing of an electronic control system of FIG. 2.

Next, at step S6, referring to the characteristic graph of FIG. 3, the target blowing rate FrOB of the front seat blower corresponding to the above-mentioned FrTAO is found. Next, at step S6a, referring to the characteristic graph of FIG. 3, the target blowing rate RrOB of the rear seat blower corresponding to the above-mentioned RrTAO is found.

Next, at step S7, the intake port mode at the front seat side corresponding to the above FrTAO is determined. As the intake port mode, as shown by the characteristic graph of FIG. 4, one of the inside air mode, inside and outside air mode, and outside air mode is selected.

Figure 5:
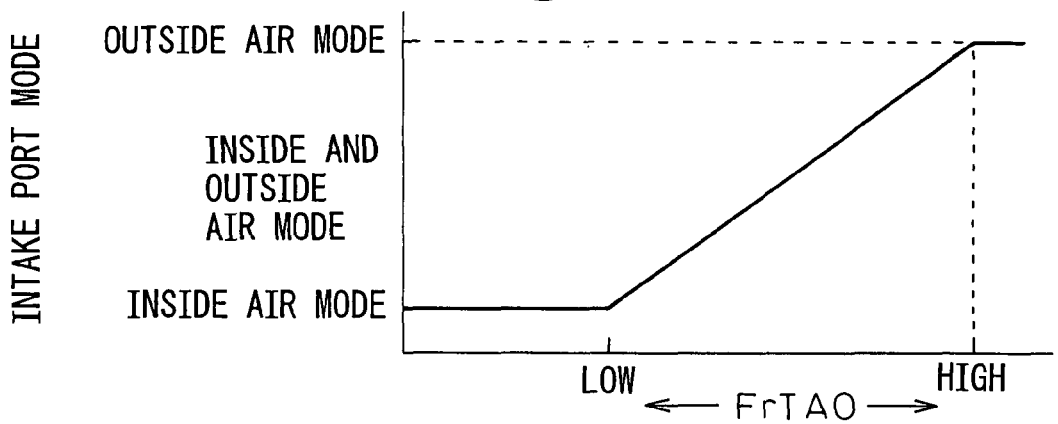
FIG. 5 is a characteristic graph used for the control processing of FIG. 3.
Figure 6:
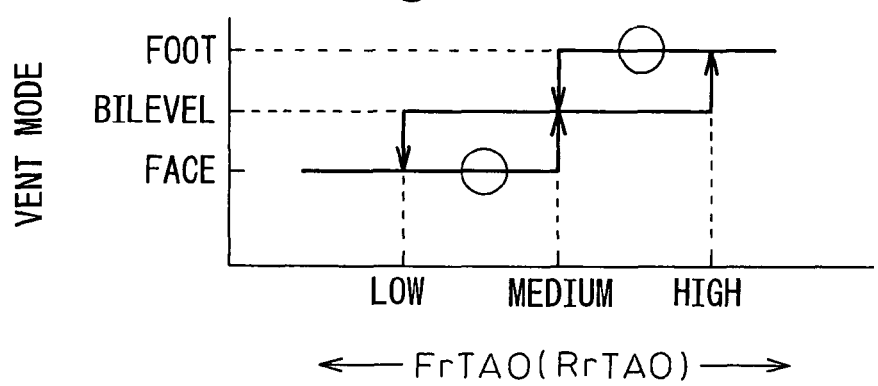
FIG. 6 is a characteristic graph used for the control processing of FIG. 3.

Next, at step S8, the vent mode at the front seat side is determined based on FrTAO. As the vent mode, as shown in FIG. 5, one of the face mode, bilevel mode, and face mode is selected. Next, the vent mode at the rear seat side is determined based on RrTAO.

Next, at step S9, the target opening degree SW of the air mix door 15 is calculated using equation (3):

$$SW = \{(FrTAO - TE)/(Tw - TE)\} \times 100(\%) \quad (3)$$

TE is the detection temperature of the evaporator vented air temperature sensor 36, while Tw is the detection temperature of the water temperature sensor 30.

Next, at step S10, whether the surface of the rear seat evaporator 8 is frosting up is judged. Details of this judgment processing will be explained with reference to FIG. 7.

Figure 8:
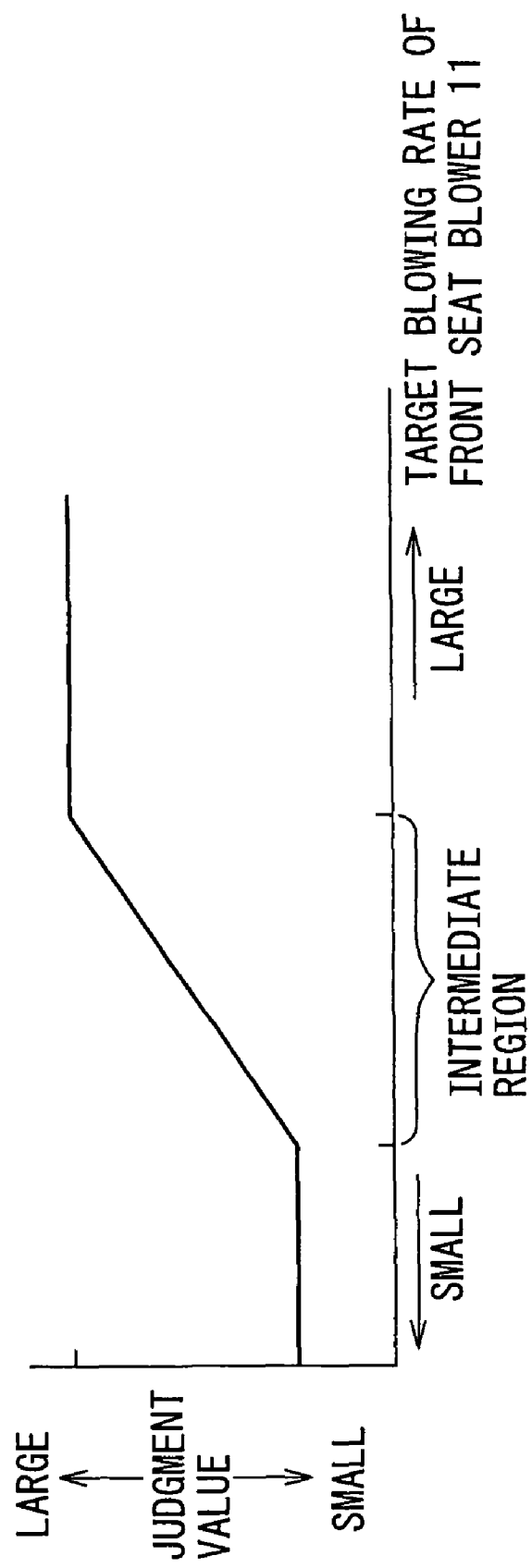
FIG. 8 is a characteristic graph used for the control processing of FIG. 3.

First, at step S20, whether the A/C switch of the operation panel 40 is turned on is judged. When the A/C switch is turned on, "YES" is judged. At the next step S21, the judgment value B used for the judgment processing explained later is found from the characteristic graph of FIG. 8. When the target blowing rate of the front seat blower 11 is set in the intermediate region, the larger the target blowing rate, the larger the judgment value B. When the target blowing rate is larger than the intermediate region, the judgment value B becomes the maximum value, while when the target blowing rate is smaller than the intermediate region, the judgment value B becomes the minimum value.

Figure 9:
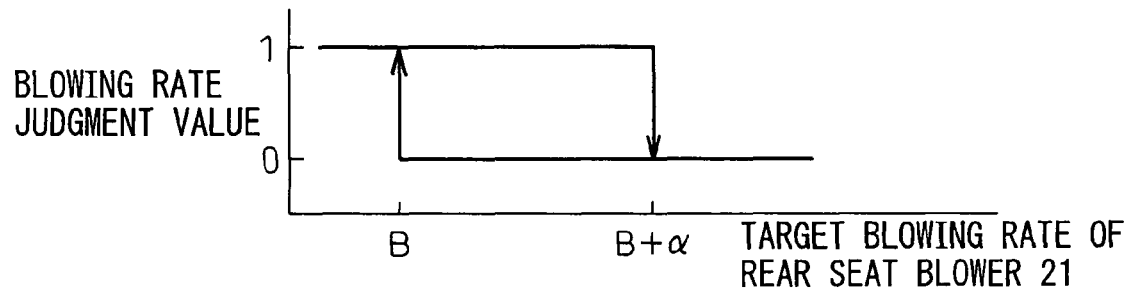
FIG. 9 is a characteristic graph used for the control processing of FIG. 3.

Next, at step S22, whether the target blowing rate of the rear seat blower 21 is smaller than B is judged based on the characteristic graph of FIG. 9. The characteristic graph of FIG. 9 is set with the hysteresis characteristic using B, (B+d (>0)). When the target blowing rate is smaller than B, the blowing rate judgment value is made "1" and "YES" is judged.

Figure 10:
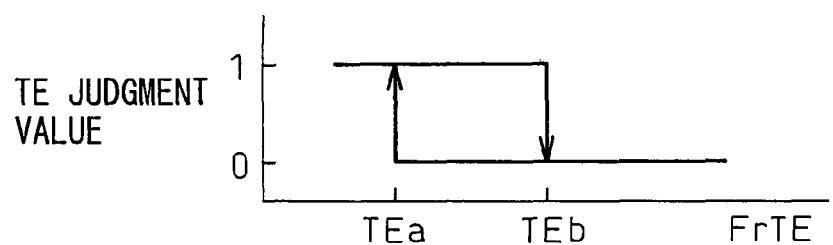
FIG. 10 is a characteristic graph used for the control processing of FIG. 3.

Next, at step S23, whether the detection temperature FrTE of the evaporator vented air temperature sensor 36 is lower than TEa is judged based on the characteristic graph of FIG. 10. The characteristic graph of FIG. 10 is set with the hysteresis characteristic using TEa, TEb. When the target blowing rate is smaller than B, the TE judgment value is made "1" and "YES" is judged.

Figure 11:
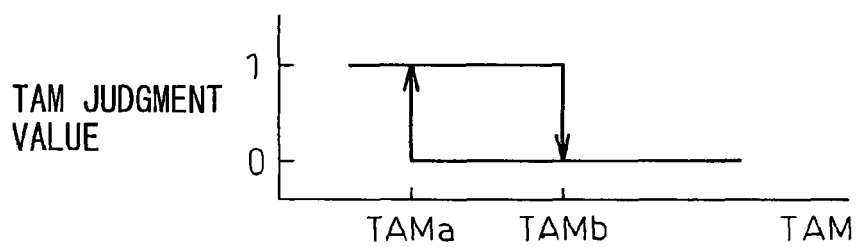
FIG. 11 is a characteristic graph used for the control processing of FIG. 3.

Next, at step S24, whether the detection temperature TAM of the outside air temperature sensor 31 is lower than TAMa is judged based on the characteristic graph of FIG. 11. For example, in the spring, fall, or another midway season, as shown in FIG. 10, the detection temperature TAM of the outside air temperature sensor 31 becomes lower than TAMa, the TAM judgment value is made "1", and "YES" is judged.

In the above way, when "YES" is judged at each of steps S20, S22, S23, S24, it is judged that the surface of the rear seat evaporator 8 is frosting up and the frost flag is set at step S25.

Further, at step S20, when the A/C switch of the operation panel 40 is turned off, "NO" is judged. At step S26, the frost flag is reset. Further, at step S22, when the target blowing rate of the rear seat blower 21 is larger than (B+d), it is judged that the surface of the rear seat evaporator 8 is not frosting up. That is, the blowing rate judgment value is made "0", "NO" is judged, and the routine proceeds to step S26. Further, at step S23, when the detection temperature FrTE of the evaporator vented air temperature sensor 36 is higher than TEb (>TEa), the TE judgment value is made "0", "NO" is judged, and the routine proceeds to step S26. Next, at step S24, when the detection temperature TAM of the outside air temperature sensor 31 is higher than TAMb (>TAMa), the TAM judgment value is made "0", "NO" is judged, and the routine proceeds to step S26.

In the above way, when the frost flag is set or reset in accordance with the state of the A/C switch, target blowing rate of the rear seat blower 21, etc., the routine shifts to the TEO calculation processing of step S11 of FIG. 3. Details of this processing will be explained with reference to FIG. 12. First, at step 30, the target temperature TEO (FrTAO) of the vented air temperature of the front seat evaporator 7 is found based on FrTAO. TEO (FrTAO) and FrTAO, as shown by the characteristic graph of FIG. 13, are set 1:1.

Figure 14:
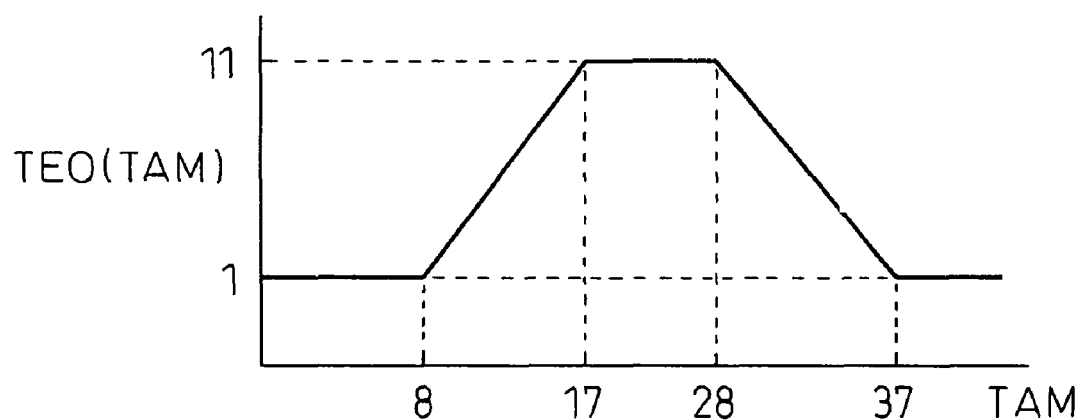
FIG. 14 is a characteristic graph used for the control processing of FIG. 3.

At the next step 31, the target temperature TEO (TAM) of the vented air temperature of the front seat evaporator 7 is found based on the TAM. The TEO (TAM) and FrTAO, as shown by the characteristic graph of FIG. 14, are set 1:1.

At the next step 32, the lower temperature of the TEO (TAM) and TEO (FrTAO) is made TEO1.

Next, at step S33, whether the above frost flag has been set or not is judged. When the frost flag has been reset (frost flag ≠1), "NO" is judged and TEO1 is set as TEO (step S35).

Next, the routine shifts to step 12 of FIG. 3 where the speed of the electric motor 2a of the electric compressor 1 is calculated based on the TEO (=TEO1). In the present embodiment, when the temperature difference between TEO and TE (detection temperature of evaporator vented air temperature sensor 36) is ΔT (=TE−TEO>0), the smaller the ΔT, the lower the speed of the electric motor 2a, while when ΔT<0, the electric motor 2a is stopped.

The control signals showing the front seat target blowing rate, rear seat target blowing rate, intake port mode, vent mode, target opening degree SW of the air mix door 15, speed of the electric motor 2a, etc. found above are output to the electric motors 11a, 21a, 12a, 15a, 18a, 24a and inverter 2c (step S13).

After this, the above steps S2, S3, S4, S5, S6, S6a . . . S13 are repeated. When the rear seat evaporator 8 is not frosting up, "NO" is judged at one of step S22 (judgment of rear seat blowing rate), step S23 (judgment of front seat evaporator venting temperature), and step S24 (judgment of outside air temperature) of FIG. 7 and the frost flag is reset at step S26. In this case, the normal control of the electric compressor 1 is performed.

Figure 12:
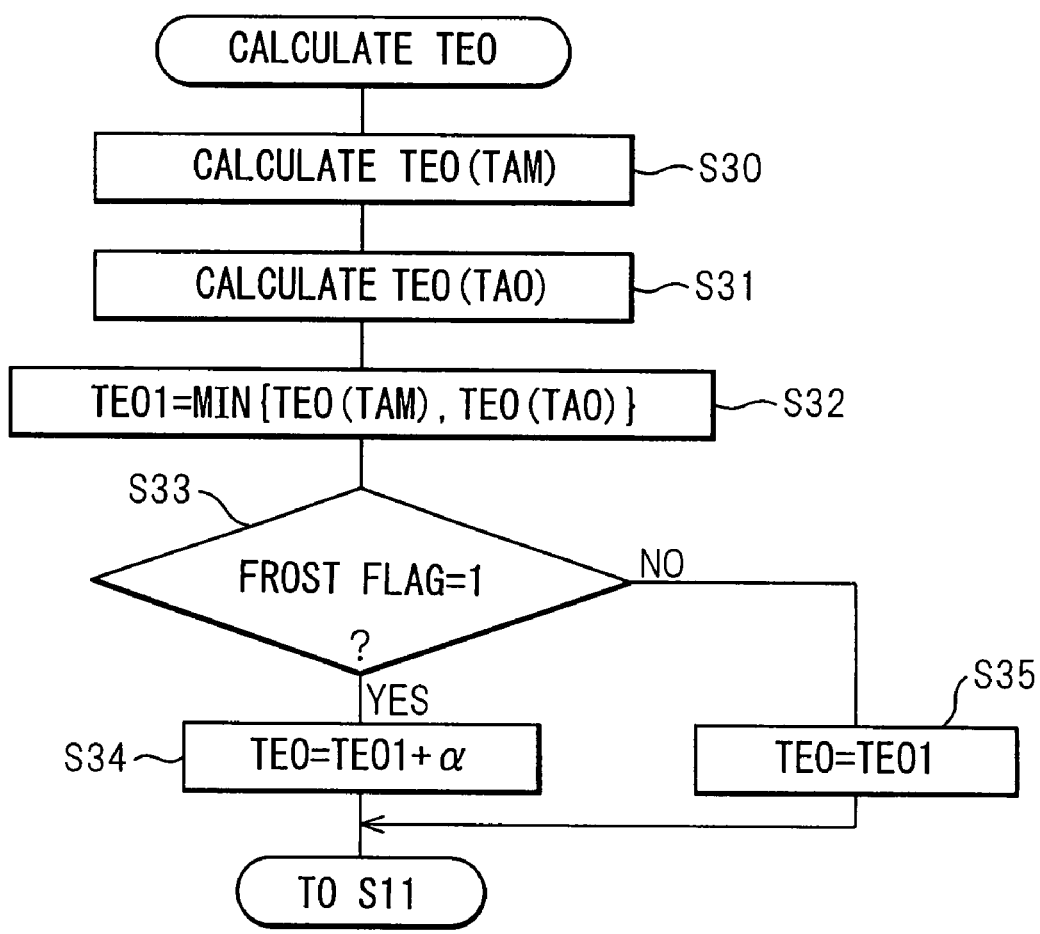
FIG. 12 is a flow chart showing in detail part of the control processing of the electronic control system of FIG. 2.
Figure 13:
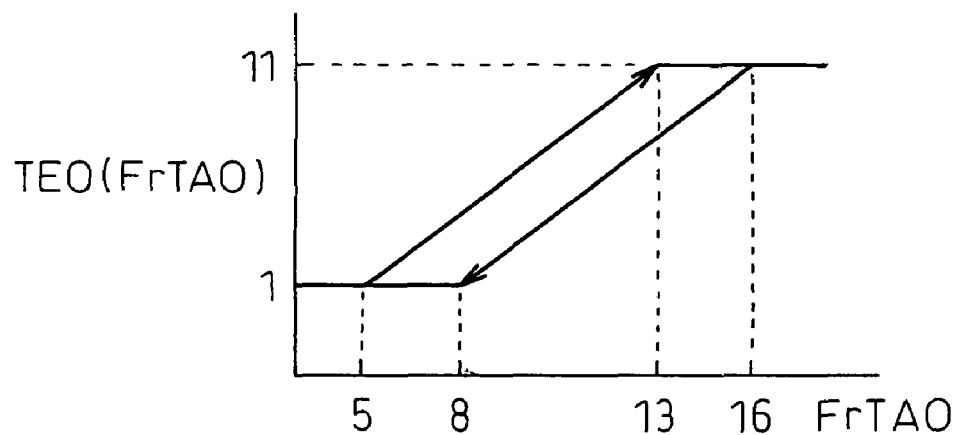
FIG. 13 is a characteristic graph used for the control processing of FIG. 3.

That is, at step S35 in FIG. 12, TEO1 is set as TEO, so the electric motor 2a of the electric compressor 1 is controlled based on the difference ΔT (TE−TEO) between TEO (=TEO1) and TE. Along with this, the refrigerant discharged from the electric compressor 1 circulates along the path of the condenser 3→receiver 4→front seat expansion valve 5→front seat evaporator 7→electric compressor 1. For this reason, at the front seat evaporator 7, the temperature of the air cooled by the refrigerant approaches TEO (=TEO1). Further, the refrigerant from the electric compressor 1 circulates along the path of the condenser 3→receiver 4→rear seat expansion valve 6→rear seat evaporator 8→electric compressor 1.

Figure 7:
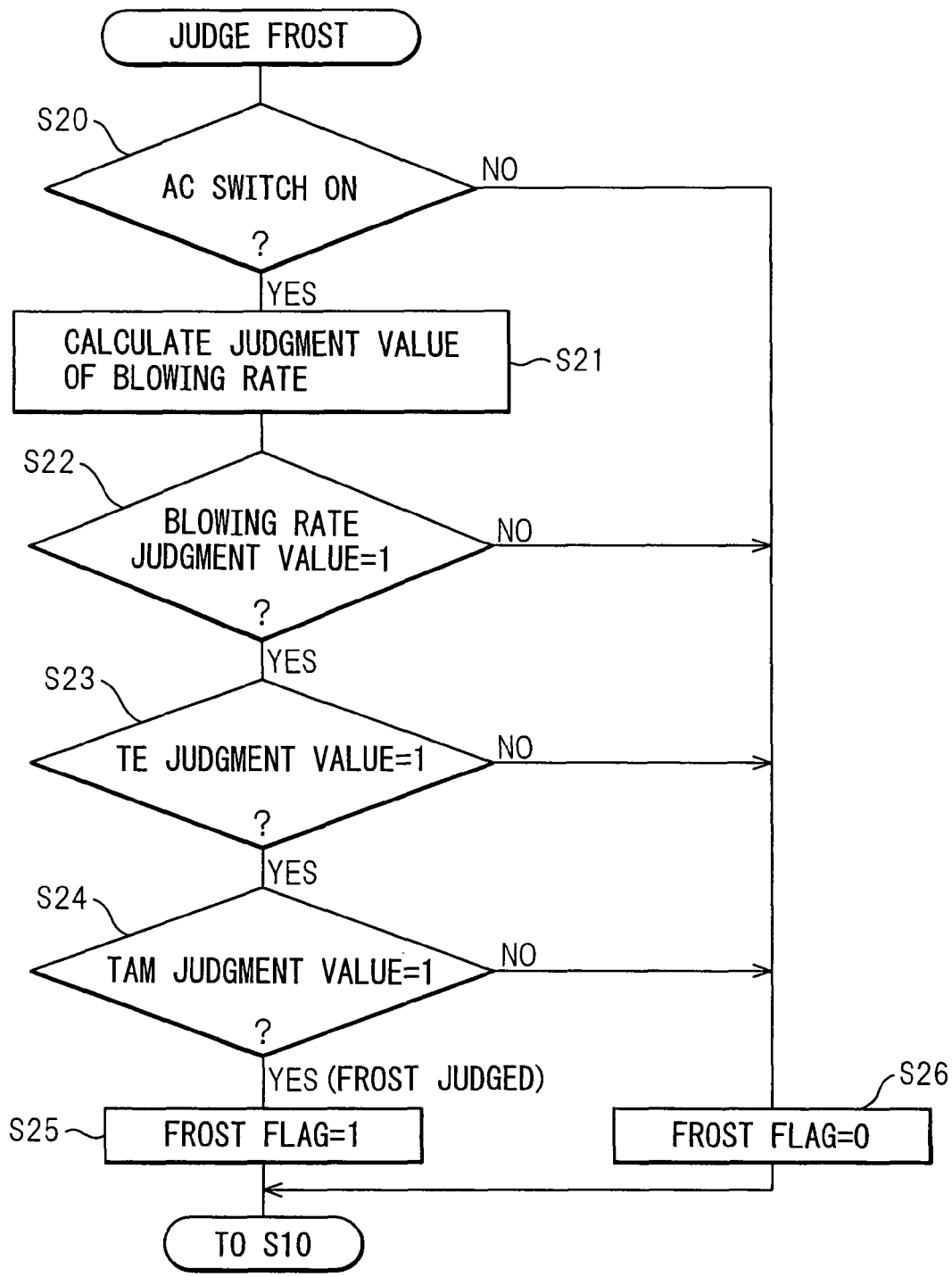
FIG. 7 is a flow chart showing in detail part of the control processing of the electronic control system of FIG. 2.

Further, if the rear seat evaporator 8 is frosting up, "YES" is judged at each of the three steps of FIG. 7 of step S22 (judgment of rear seat blowing rate), step S23 (judgment of front seat evaporator venting temperature), and step S24 (judgment of outside air temperature). Along with this, it is assumed that the rear seat evaporator 8 is frosting up and the frost flag is set at step S26.

In this case, the electric compressor 1 is controlled to defrost the rear seat evaporator 8. At step S34 in FIG. 12, (TEO1+α) is set as TEO. As α (>0), for example, 0.5° C. is used. Due to this, compared with before the rear seat evaporator 8 is frosting up, the TEO rises and the TEO becomes higher than TE (detection temperature of evaporator vented air temperature sensor 36).

For this reason, the electric motor 2a of the electric compressor 1 is stopped. Along with this, the refrigerant can no longer be discharged from the electric compressor 1, so refrigerant no longer flows to the rear seat evaporator 8. At this time, the rear seat evaporator 8 absorbs heat from the air blown from the rear seat blower 21, so the surface of the rear seat evaporator 8 rises in temperature.

After this, the processings of steps S2, S3, S4, S5 . . . S10 {S22:YES, S23:YES, S24:YES}, S11{TEO=TEO1+α}, S12, S13 are repeated. Further, if the surface of the rear seat evaporator 8 is defrosted, as explained above, "NO" is judged at each of steps S22, S23, S24 of FIG. 7 and, at step S26, the frost flag is reset. Due to this, normal control of the electric compressor 1 is reset.

According to the present embodiment explained above, in the electronic control system 45, it is judged that the surface of the rear seat evaporator 8 is frosting up when the target blowing rate of the rear seat blower 21 is smaller than B (step S22:YES), the detection temperature FrTE of the evaporator vented air temperature sensor 36 is lower than TEa (step S23:YES), and the detection temperature TAM of the outside air temperature sensor 31 is lower than TAMa (step S24: YES). At this time, since the TEO is raised, the electric motor 2a of the electric compressor 1 is stopped. For this reason, refrigerant no longer flows to the rear seat evaporator 8 and the temperature of the surface of the rear seat evaporator 8 rises, so the rear seat evaporator 8 can be defrosted.

According to the above, even if the surface of the rear seat evaporator 8 is frosting up, the rear seat evaporator 8 can be defrosted, so it is possible to prevent the vented temperature of the rear seat evaporator 8 from becoming unable to be adjusted.

Further, the electronic control system 45 can stop the electric motor 2a of the electric compressor 1 directly without raising the TEO when judging that the surface of the rear seat evaporator 8 is frosting up, but after this special processing is necessary for resetting normal control of the electric compressor 1.

As opposed to this, according to the present embodiment, if raising the TEO to defrost the rear seat evaporator 8, then defrosting the rear seat evaporator 8, it is possible to reset normal control of the electric compressor 1 without special processing.

Further, the greater the blowing rate of the front seat blower 11, the greater the amount of air not cooled by the refrigerant at the front seat evaporator 7 in the air blown from the front seat blower 11, so the higher the temperature of the vented air of the front seat evaporator 7 tends to be. At this time, to prevent the temperature difference between the vented air temperature of the front seat evaporator 7 and the target temperature TEO from growing, the discharge capacity of the refrigerant of the electric compressor 2 is increased. For this reason, the amount of refrigerant flowing into the rear seat evaporator 8 is also increased, so the rear seat evaporator 8 easily frosts up. That is, the greater the blowing rate of the front seat blower 11, the easier the rear seat evaporator 8 to frost up.

As opposed to this, in the present embodiment, when judging whether the surface of the rear seat evaporator 8 is frosting up, the higher the blowing rate of the front seat blower 11, the more the judgment value B is raised. Therefore, whether the surface of the rear seat evaporator 8 is frosting up can be accurately judged based on the blowing rate of the front seat blower 11.

In general, in the summer or other times when the temperature of the outside air is high, the surfaces of the evaporators will not frost up due to the effect of the outside air. As opposed to this, in the present embodiment, it is judged that the surface of the rear seat evaporator 8 is frosting up only so long as TAM is lower than TAMa, the target blowing rate of the rear seat blower 21 is smaller than B, and the detection temperature FrTE of the evaporator vented air temperature sensor 36 is lower than TEa. Therefore, mistaken judgment that the surface of the rear seat evaporator 8 is frosting up can be avoided despite the outside air temperature being high. For this reason, whether the surface of the rear seat evaporator 8 is frosting up can be accurately judged.

In the above embodiment, the example of the electronic control system 45 raising the TEO to lower the discharge capacity of the electric compressor 2 so as to defrost the rear seat evaporator 8 was explained, but instead of this, the electronic control system 45 may also be configured as explained in the following (1) and (2).

Figure 4:
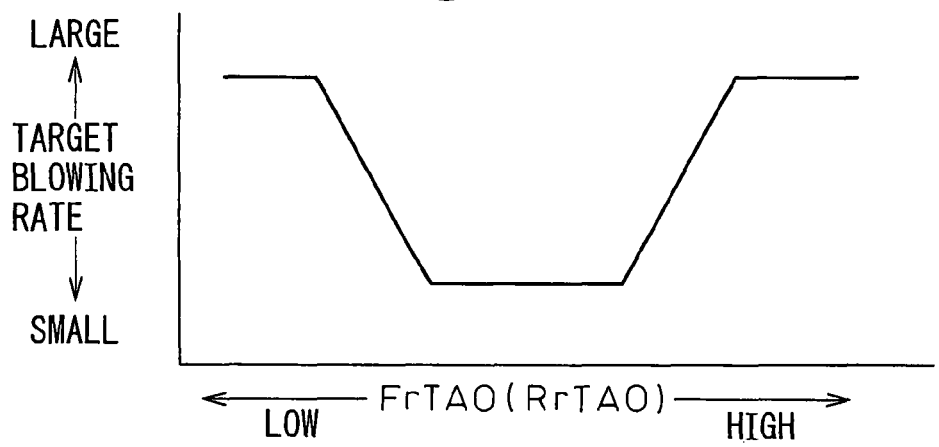
FIG. 4 is a characteristic graph used for the control processing of FIG. 3.

(1) Based on the characteristic graph of FIG. 4, the target blowing rate RrOBW of the rear seat blower 21 corresponding to RrTAO is found and the target blowing rate RrOBW is increased by a predetermined amount γ(>0) to find the target blowing rate (RrOBW+γ). Further, when it is judged that the surface of the rear seat evaporator 8 is not frosting up, the rear seat blower 21 is controlled so as to make the blowing rate of the rear seat blower 21 approach RrOBW, while when it is judged that the surface of the rear seat evaporator 8 is frosting up, the rear seat blower 21 is controlled so as to make the blowing rate of the rear seat blower 21 approach (RrOBW+γ).

Therefore, when the surface of the rear seat evaporator 8 is frosting up, the blowing rate of the rear seat blower 21 can be increased compared to when the surface of the rear seat evaporator 8 is not frosting up, so the rear seat evaporator 8 can absorb a large amount of heat from the air blown by the rear seat blower 21. For this reason, the rear seat evaporator 8 can be defrosted.

In this case, the rear seat evaporator 8 can be defrosted without regard as to the operation of the electric compressor 1. For this reason, when increasing the blowing rate of the rear seat blower 21 to defrost the rear seat evaporator 8, the refrigerant can flow from the electric compressor 1 to the front seat evaporator 11, so the air-conditioning control of the front seat side can be maintained.

(2) By reducing the blowing rate of the front seat blower 11, the rear seat evaporator 8 is defrosted. Specifically, the target blowing rate FrOBW of the front seat blower 11 corresponding to the FrTAO is found based on the characteristic graph of FIG. 4 and the target blowing rate FrOBW is reduced by a predetermined amount δ to find the target blowing rate (FrOBW-δ). Further, when it is judged that the surface of the front seat evaporator 7 is not frosting up, the front seat blower 11 is controlled so that the blowing rate of the front seat blower 11 approaches FrOBW. When it is judged that the surface of the rear seat evaporator 8 is frosting up, the front seat blower 11 is controlled so that the blowing rate of the front seat blower 11 approaches (FrOBW-δ).

Therefore, when the surface of the rear seat evaporator 8 is frosting up, it is possible to reduce the blowing rate of the front seat blower 11 compared to when the surface of the rear seat evaporator 8 is not frosting up.

Here, if reducing the blowing rate of the front seat blower 11, the refrigerant can sufficient absorb heat from the blown air in the front seat evaporator 7. For this reason, the detection temperature TE of the evaporator vented air temperature sensor 36 falls and approaches the TEO, so the discharge capacity of the refrigerant of the electric compressor 1 falls. Therefore, the amount of the refrigerant flowing into the rear seat evaporator 8 falls, so the rear seat evaporator 8 can be defrosted.

In the above embodiment, the example was explained of providing two expansion valves of the front seat expansion valve 5 and rear seat expansion valve 6 corresponding to the front seat evaporator 7 and rear seat evaporator 8, but instead of this it is also possible to provide a common expansion valve for the front seat evaporator 7 and rear seat evaporator 8.

In the above embodiment, the example of use of two evaporators of the front seat evaporator 7 and rear seat evaporator 8 was explained, but the invention is not limited to this. It is also possible to use three or more evaporators.

In the above embodiment, the example of application of the air-conditioning system according to the present invention to a vehicular air-conditioning system was explained, but the invention is not limited to this. It may be applied to various types of air-conditioning systems such as factory air-conditioning systems, office air-conditioning systems, home air-conditioning systems, etc. so long as they are air-conditioning systems using a plurality of evaporators.

In the above embodiment, the example of use of the outside air temperature when judging whether the surface of the rear seat evaporator 8 is frosting up will be explained, but the invention is not limited to this. It is also possible not to use the outside air temperature and to judge whether the surface of the rear seat evaporator 8 is frosting up by just the blowing rate of the rear seat blower 21 and the detection temperature of the evaporator vented air temperature sensor 36.

In the above embodiment, the example of using the electric compressor 2 as the compressor was explained, but the invention is not limited to this. It is also possible to use a compressor driven by a vehicle engine. For example, as the compressor, it is also possible to use a variable capacity type compressor controlled in discharge capacity by a control signal from the outside or a fixed capacity type compressor with a fixed amount of discharge of the refrigerant.

While the invention has been described with reference to specific embodiments chosen for purpose of illustration, it should be apparent that numerous modifications could be made thereto by those skilled in the art without departing from the basic concept and scope of the invention.

The invention claimed is:

1. An air-conditioning system comprising:
   a compressor compressing refrigerant,
   first and second blowers,
   a first evaporator forming a refrigeration cycle apparatus along with said compressor, the first evaporator cooling air blown from said first blower by evaporation of said refrigerant,
   a second evaporator arranged in parallel with said first evaporator in a flow direction of said refrigerant from said compressor, the second evaporator cooling air blown from said second blower by evaporation of said refrigerant,
   means for detecting a temperature of vented air blown out from said first evaporator, and
   means for controlling said compressor to bring a vented air temperature blown out from said first evaporator close to a target evaporator temperature based on a detected value of said detecting means,
   first means for judging that a surface of said second evaporator is not frosting up when at least one of the blowing rate of said second blower is equal to or greater than a predetermined flow rate and said detected value of said detecting means is equal to or greater than a first temperature; and
   second means for judging that the surface of said second evaporator is frosting up when a blowing rate of said second blower is less than said predetermined flow rate and said detected value of said detecting means is less than said first temperature, and
   means for reducing an amount of discharge of the refrigerant from said compressor for defrosting said second evaporator when it is judged that the surface of said second evaporator is frosting up by said second judging means.

2. The air-conditioning system as set forth in claim 1, further comprising:
   a heater unit heating cool air from said first evaporator,
   a bypass passage bypassing said heater unit and carrying cool air from said first evaporator,
   an air mix door adjusting a ratio of an amount of air flowing into said heater unit and an amount of air flowing into said bypass passage to adjust a temperature of vented air blown out from vents into a vehicle compartment,
   means for controlling said air mix door to bring the temperature of the vented air blown out from said vents close to a target vented air temperature,
   means for detecting an air temperature outside the vehicle compartment,
   means for calculating said target evaporator temperature based on the detected temperature of said detecting means and said target vented air temperature, and
   means for adding a predetermined value to a value calculated by said calculating means, wherein
   when it is judged that the surface of said second evaporator is not frosting up by said first judging means, said reducing means uses a value found by the calculating means as the target evaporator temperature to control said compressor,
   when it is judged that the surface of said second evaporator is frosting up by said judging means, said reducing means uses a value found by the adding means as the target evaporator temperature to control said compressor and
   said reducing means uses the value found by said adding means as the target evaporator temperature to control the compressor so as to reduce the amount of discharge of the refrigerant from said compressor.

3. The air-conditioning system as set forth in claim 1, wherein said reducing means stops said compressor to reduce the amount of discharge of the refrigerant from said compressor.

4. The air-conditioning system as set forth in claim 1, wherein said second judging means raises said predetermined flow rate to be greater than the blowing rate of said first blower when judging that the surface of said second evaporator is frosting up.

5. The air-conditioning system as set forth in claim 1, further comprising:
   means for detecting a temperature of air outside a vehicle compartment, wherein
   said first judging means judges that the surface of said second evaporator is not frosting up when the detected temperature of the outside air is equal to or greater than a second temperature; and
   said second judging means judges that the surface of said second evaporator is frosting up when the detected temperature of the outside air is less than said second temperature, a blowing rate of said second blower is less than a predetermined amount, and a detected temperature of said vented air is less than said first temperature.

6. An air-conditioning system comprising:
   a compressor compressing a refrigerant,
   first and second blowers,
   a first evaporator forming a refrigeration cycle apparatus along with said compressor, the first evaporator cooling air blown from said first blower by evaporation of said refrigerant,
   a second evaporator arranged in parallel with said first evaporator in a flow direction of said refrigerant from said compressor, the second evaporator cooling air blown from said second blower by evaporation of said refrigerant,
   means for detecting a temperature of vented air blown out from said first evaporator,
   means for controlling said compressor to bring a vented air temperature blown out from said first evaporator close to a target evaporator temperature based on a detected value of said detecting means,
   first means for judging that a surface of said second evaporator is not frosting up when at least one of the blowing rate of said second blower is equal to or greater than a predetermined flow rate and said detected value of said detecting means is equal to or greater than a first temperature; and second means for judging that the surface of said second evaporator is frosting up when a blowing rate of said second blower is less than said predetermined flow rate and said detected value of said detecting means is less than said first temperature, and means for increasing the blowing rate from said second blower to defrost said second evaporator when it is judged that the surface of said second evaporator is frosting up by said second judging means.

7. The air-conditioning system as set forth in claim 6, further comprising:

a heater unit heating cool air from said first evaporator, a bypass passage bypassing said heater unit and carrying cool air from said first evaporator, an air mix door for adjusting a ratio of an amount of air flowing into said heater unit and an amount of air flowing into said bypass passage to adjust a temperature of vented air blown out from vents into a vehicle compartment, means for controlling said air mix door to bring the temperature of the vented air blown out from said vents close to a target vented air temperature, means for calculating a target blowing rate of said second blower based on said target vented air temperature, and means for adding a predetermined amount to a target blowing rate calculated by said calculating means, wherein when it is judged that the surface of said second evaporator is not frosting up by said first judging means, said increasing means controls said second blower so as to make a blowing rate of said second blower approach the target blowing rate found by said calculating means, when it is judged that the surface of said second evaporator is frosting up, said increasing means controls said second blower so as to make the blowing rate of said second blower approach the blowing rate found by said adding means and said increasing means controls said second blower so as to increase the blowing rate from said second blower so as to make a blowing rate of said second blower approach the blowing rate found by said adding means.

8. An air-conditioning system comprising:

a compressor compressing a refrigerant, first and second blowers, a first evaporator forming a refrigeration cycle apparatus along with said compressor, the first evaporator cooling air blown from said first blower by evaporation of said refrigerant, a second evaporator arranged in parallel with said first evaporator in a flow direction of said refrigerant from said compressor, the second evaporator cooling air blown from said second blower by evaporation of said refrigerant, means for detecting a temperature of vented air blown out from said first evaporator, and means for controlling said compressor to bring a vented air temperature blown out from said first evaporator close to a target evaporator temperature based on a detected value of said detecting means, first means for judging that a surface of said second evaporator is not frosting up when at least one of the blowing rate of said second blower is equal to or greater than a predetermined flow rate and said detected value of said detecting means is equal to or greater than a first temperature and second means for judging that the surface of said second evaporator is frosting up when a blowing rate of said second blower is less than said predetermined flow rate and said detected value of detecting means is less than said first temperature, and means for decreasing the blowing rate from said first blower to defrost said second evaporator when it is judged that the surface of said second evaporator is frosting up by said second judging means.

9. The air-conditioning system as set forth in claim 8, further comprising:

a heater unit heating cool air from said first evaporator, a bypass passage bypassing said heater unit and carrying cool air from said first evaporator, an air mix door adjusting a ratio of an amount of air flowing into said heater unit and an amount of air flowing into said bypass passage to adjust a temperature of vented air blown out from vents into a vehicle compartment, means for controlling said air mix door to bring the temperature of the vented air blown out from said vents close to a target vented air temperature, means for calculating a target blowing rate of said first blower based on said target vented air temperature, and means for adding a predetermined amount to the target blowing rate calculated by said calculating means, wherein when it is judged that the surface of said second evaporator is not frosting up by said first judging means, said decreasing means controls said first blower so as to make a blowing rate of said first blower approach the target blowing rate found by said calculating means, when it is judged that the surface of said second evaporator is frosting up by said second judging means, said decreasing means controls said first blower so as to make the blowing rate of said first blower approach the blowing rate found by said adding means and said decreasing means controls said first blower so as to decrease the blowing rate from said first blower so as to make a blowing rate of said first blower approach the blowing rate found by said decreasing means.

* * * * *